E. S. JONES.
RESILIENT TIRE.
APPLICATION FILED MAR. 6, 1917.
1,241,852.
Patented Oct. 2, 1917.
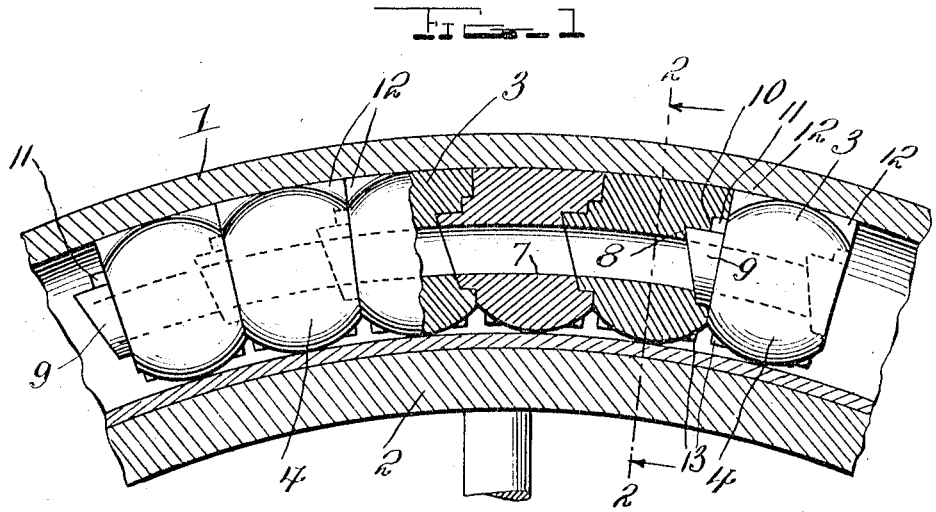
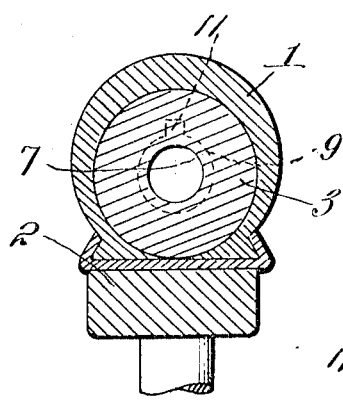
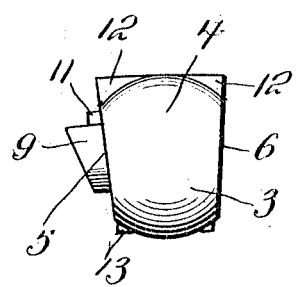
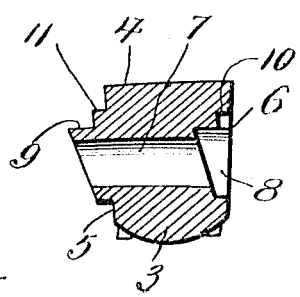
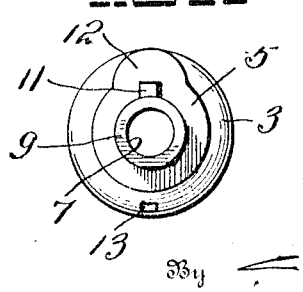
Inventor
Edward S. Jones
By
Attorney

UNITED STATES PATENT OFFICE.

EDWARD S. JONES, OF MOBILE, ALABAMA, ASSIGNOR OF ONE-TENTH TO MAURICE W. MEYER AND NORMAN H. MEYER, BOTH OF MOBILE, ALABAMA.

RESILIENT TIRE.

1,241,852.      Specification of Letters Patent.      Patented Oct. 2, 1917.

Application filed March 6, 1917. Serial No. 152,748.

*To all whom it may concern:*

Be it known that I, EDWARD S. JONES, a citizen of the United States, residing at Mobile, in the county of Mobile and State of Alabama, have invented new and useful Improvements in Resilient Tires, of which the following is a specification.

This invention relates to resilient tires for automobiles and other vehicle wheels, comprehending particularly the provision of a tire which embodies all the advantages of the pneumatic tires in common use while obviating the well known objections to and disadvantages of tires of this class.

The primary object of my invention is to provide a tire consisting of an outer casing and a core of novel construction arranged therein, said core comprising resilient sections of such form and so connected as to have free articulation to secure ease of motion and resilient action to effectually absorb shocks and jars, while being free from liability of punctures, blow-outs, valve troubles, the necessity of more or less frequent inflation with aeriform fluid, and the other annoyances, difficulties and troubles incident to the use of pneumatic tires.

A further object of the invention is to provide a tire core in which the core sections composed of elastic bodies or members are interlocked in such a manner as to be interchangeable, so that in case of the deterioration of or any possible damage to any section of the core, any section may be readily and conveniently substituted in lieu thereof.

A still further object of the invention is to provide a construction and mode of connecting the core sections, whereby such sections are held from relative displacement, also to provide fillers upon the core sections to close the spaces between the outer surfaces of said sections and the inner periphery of the tread surface of the tire, whereby a uniform bearing surface continuously around the tire is afforded, and also to provide a core which may be readily and conveniently manufactured and sold at a comparatively low cost.

With these and other objects in view, the invention consists of the features of construction, combination and arrangement of parts, hereinafter fully described and claimed, reference being had to the accompanying drawing, in which:—

Figure 1 is a longitudinal section through a portion of a vehicle wheel and outer casing of a tire embodying my invention, showing some of the core sections in elevation and others in longitudinal section.

Fig. 2 is a vertical transverse section through the tire on the line 2—2 of Fig. 1.

Fig. 3 is a side elevation of one of the core sections detached.

Fig. 4 is a vertical longitudinal section through the same.

Fig. 5 is an end elevation of one of the core sections.

In the practical embodiment of my invention, I provide a resilient tire comprising an outer casing 1, which may be of any of the forms in common use, and of any suitable construction for engagement with the rim 2 of the vehicle wheel, a casing and rim of the clencher type being shown in the present instance.

The casing 1 is provided on its rim side, as is usual, with an opening for the insertion and removal of the tire core 3, which is in the form of an annulus extending completely around the interior of the casing and substantially filling the same.

The core 3 consists, in accordance with my invention, of series of interchangeable sections 4 cast or molded from rubber or other suitable resilient material. Each of these sections 4, which sections are interchangeable with each other, is approximately of circular form in central cross section, the inner, outer and side portions of each core section being curved to conform to the contour of the inner surface of the outer casing, while the remaining surfaces 5 and 6 of the core section are flattened transversely to provide abutment or contact surfaces for abutting engagement with each other.

The surfaces 5 and 6 are beveled or relatively converge in an inward direction, or toward the rim side of the outer casing, in order that the core sections when connected will be properly disposed in a curved line to conform to the annular shape of the tire, and for a proper yielding or cushioning action in a radial line and a proper transmission of the pressures and strains in the movement of the wheel to secure smoothness of action and adapt the tire to withstand pressures and strains to a high degree.

Each core section is provided with a bore or passage 7, terminating at one end in a socket 8 intersecting the abutment face 6 and continuing at its opposite end through a tubular projection 9 extending beyond the abutment face 5. The socket 8 of each core section is designed to receive the tubular projection 9 of another core section disposed at one side thereof, while the tubular projection 9 of the particular core section in question is adapted to fit within the socket 8 of the core section on the opposite side thereof, whereby the core sections are interconnected and held truly centered at all times and in all positions they assume in the motion of the wheel. The inner wall of the socket 8 and the outer extremity of the tubular projection 9 of each core section are beveled at a somewhat greater angle than the bevel of the surfaces 5 and 6, in order that the abutment surfaces of the inner engaging sockets and tubular projections of the various core sections may have relative play and accommodate themselves to relative variations of the core sections under varying degrees of pressures and strains, due to varying load weights and the passage of the tire over different irregularities of surface, whereby the cushioning action is increased and the core sections adapted to effectually absorb all shocks and jars without any material degree of relative displacement thereof.

In order to hold the core sections interlocked against relative, lateral or axial movements, a recess 10, preferably of angular form is provided in the surface 6 of each core section, which recess intersects the socket 8 of said section, while the face 5 of each core section is provided with an angular key or lug 11 to engage the recess 10 of another adjacent core section, whereby when the core sections are connected they will be held from relative movement in any direction liable to cause separation or disconnection thereof. The passages 7 are provided in the core sections and arranged to intersect the sockets 8 and extend through the projections 9, in order to reduce the weight of the core sections, to effect a saving in the rubber or other resilient material employed, and to enable the thickness or solidity of the core sections to be varied as desired. Thus, when the core sections are to be employed upon the wheel of a truck or other heavy vehicle, the passages may be made relatively small, in which case the core sections will be comparatively heavy, while in the use of the core sections upon the wheels of lighter vehicles the passages may be enlarged proportionately, in order to avoid excess weight, while at the same time forming a sufficient area of cushioning surface.

Bridging projections 12 extend from the abutment faces of the core sections between the recesses 10 and lugs 11 and the tread surfaces of said core sections, and the adjacent bridging projections of the core sections are arranged to abut completely around the core and to thus close the angular spaces between the curved sides of the tread portions of the sections and the inner face of the tread surface of the tire. These bridging projections lie flush with the tread surfaces of the core sections and thereby form therewith a continuous tread surface for the core, whereby a uniform bearing between the tread surface of the core and outer casing are obtained entirely around the tire, affording uniform pressures, a uniform backing for the tread surface of the tire completely around the same, and a smoother running action of the tire in traveling over varying irregularities of ground surface. Furthermore, the bridging projections 12 serve to equalize the strains, particularly when the tire is sustaining a heavy load weight, to prevent puncture or other damage to the outer casing when a portion of the casing is in contact with a stone or other obstruction in the road or other irregularity of surface above the general ground or street level. Indicating lugs or projections 13 are provided upon the inner or rim surfaces of the core sections and are adapted in the assemblage of the core sections to register accurately with one another. By this means the operator will be guided in inserting the core sections through the slit in the rim side of the casing, so as to properly dispose the core sections to bring their projections, sockets and recesses into register or matching relation for an absolutely accurate engagement with each other.

It will be seen from the foregoing description that the invention provides a tire composed of an outer casing, which may be of any ordinary construction, and an inner resilient core arranged within said outer casing, which core is designed to fill the outer casing and form a resilient backing for the tread surface thereof, the core taking the place of the compressed air used in the ordinary pneumatic tire. It will be observed that this core is composed of resilient sections affording a resilient filler or backing for the outer casing which is non-puncturable, thus providing a tire which overcomes the well known objections to tires of the pneumatic type. Furthermore, it will be seen that these core sections are interlocked and held from relative displacement, but are detachably coupled and interchangeable with each other, thus allowing the core elements to be conveniently assembled within a tire casing and one or more to be readily removed, in case of deterioration or damage, to permit of others being as conveniently substituted therefor. It will be evident that the core sections may be made heavy or light, and of different diameters, as circumstances may require in their adaptation to tires of different sizes and for light and heavy vehicles, and that in all cases a complete tire is provided which is not only puncture proof and free from valves and other parts liable to get out of order, but which insures ample resiliency and easy running without making the tire of excessive or objectional weight. As the sections of the core are inclosed and protected it will be apparent that they will not be affected by air, moisture or sunlight, and thus will not be so readily subjected to deterioration or disintegration, adapting them to last a long time before renewal of the core or any part thereof as required. As such a core may be successively applied to different casings as the casings are worn out, it will be seen that economy will be secured over the use of ordinary pneumatic tires with inner tubes, and it will further be seen that as the core forms a uniform backing for the tread and sides of the outer casing the casing will also be protected to a large extent against rapid wear and will last for a longer period.

A material advantage incident to the present invention is that, due to the resilient character of the inner construction or core of the tire, the outer casing or covering is free from the strains thereon falling upon an ordinary pneumatic tire due to the air pressure therein, which pressure has a tendency to stretch and constantly weaken the casing, so that a casing when worn to any extent is liable to blow-outs and must be discarded. With my construction, on the other hand, a casing with the resilient core can be used until it is practically worn out, thus securing a wide range of economy in the long run in the use of my improved tire over an ordinary pneumatic tire. As the core may be made of any size, thickness and resiliency, it is evident that great durability will be secured, and that therefore the tire will be of superior value if used upon trucks and other heavy vehicles, as it will stand great wear and tear in running over rough surfaces and sustaining heavy shocks and jars without throwing strains upon the vehicle. Moreover, the necessity of carrying extra tubes and casings will be eliminated or reduced to a very large extent.

The advantages of my improved tire over an ordinary pneumatic tire in obviating punctures, blow-outs, valve troubles and other annoyances will be appreciated, and other advantages of the invention will be fully understood by those versed in the art from the foregoing description.

Having described my invention, I claim:

1. A tire comprising an outer casing and a core inclosed therein, said core comprising resilient sections having rounded surfaces, the rounded surfaces of the tread portions of the sections being provided with bridging projections filling the spaces between them and forming a continuous tread surface about the outer periphery of the core.

2. A tire comprising an outer casing and a resilient core inclosed therein, said core consisting of an annular series of resilient sections provided with abutment faces, said abutment faces having sockets and projections for interfitting engagement, and indicating elements upon said core sections adapted for alinement with each other to indicate when said interfitting surfaces are in engagement with each other.

3. A resilient tire comprising an outer casing and an inner core consisting of an annular series of resilient sections, each section having a passage, a socket at one side thereof communicating with the passage, and a tubular projection at its opposite side communicating with the passage, the sockets and projections of adjacent core sections throughout the series having interfitting engagement with each other.

4. A tire comprising an outer casing and a resilient core inclosed therein, said core comprising sections of resilient material rounded in cross section and having flattened abutment faces, the opposite abutment faces of each section being respectively provided with a socket having a beveled inner wall and a projection having a beveled end portion, the sockets and projections of the sections having interfitting engagement with each other, said sections also being provided with engaging recesses and lugs to hold said sections against relative shifting movements.

5. A tire comprising an outer casing and a core inclosed therein, said core comprising interchangeable, interengaging resilient sections having rounded surfaces, the rounded surfaces of the tread portions of the sections being provided with bridging projections filling the spaces between them and forming a continuous tread surface about the outer periphery of the core.

6. A tire comprising an outer casing and a resilient core inclosed therein, said core consisting of an annular series of resilient sections provided with passages and abutment faces, said abutment faces having sockets and projections for interfitting engagement, and indicating elements upon said core sections adapted for alinement with each other to indicate when said interfitting surfaces are in engagement with each other.

7. A resilient tire comprising an outer casing and a resilient core inclosed therein, said core comprising an annular series of resilient sections, rounded in cross section, having flattened abutment faces extending at an angle to their axes and radially to the axis of the tire, said abutment faces being provided with sets of recesses and projections for interfitting and interlocking engagement, and having bridging projections filling the spaces between adjacent sections at the tread side thereof, to form a continuous bearing surface around said tread side to impinge against the tread face of the outer casing.

In testimony whereof I affix my signature.

EDWARD S. JONES.

Copies of this patent may be obtained for five cents each, by addressing the "Commissioner of Patents, Washington, D. C."